United States Patent [19]
Kerdoncuff et al.

[11] Patent Number: 4,570,235
[45] Date of Patent: Feb. 11, 1986

[54] DIGITAL RECEIVER OF MULTIFREQUENCY SIGNALS WITH FREQUENCY RECOGNITION DEVICE

[75] Inventors: Guy P. Kerdoncuff, Perros Guirec; Jacques H. Provendier, Lannion, both of France

[73] Assignee: Societe Anonyme de Telecommunications, Paris, France

[21] Appl. No.: 410,078

[22] Filed: Aug. 20, 1982

[30] Foreign Application Priority Data

Aug. 27, 1981 [FR] France ................... 81 16351

[51] Int. Cl.$^4$ ..................... G06F 15/31; H04M 1/50
[52] U.S. Cl. ............................. 364/724; 179/84 VF
[58] Field of Search ................. 364/724; 179/84 VF; 370/110.3

[56] References Cited

U.S. PATENT DOCUMENTS

3,683,162  8/1972  Jacob et al. ................ 364/724
4,109,109  8/1978  Molleron ..................... 364/724
4,302,817 11/1981  Labedz ........................ 364/724
4,328,398  5/1982  Kawaguchi et al. ....... 179/84 VF
4,354,248 10/1982  Conger et al. .............. 364/724
4,363,100 12/1982  Agnew et al. ............. 179/84 VF
4,399,536  8/1983  Metz ........................... 370/110.3

Primary Examiner—David H. Malzahn
Attorney, Agent, or Firm—Holman & Stern

[57] ABSTRACT

The present invention relates to a digital frequency recognition device for a receiver of multifrequency PCM signals, and consists essentially in forming characteristic values $V(f_i)$ for each frequency $f_i$, in forming characteristic values $V(f_{i\pm 1})$ for adjacent frequencies of the code in question, in comparing the value $V(f_i)$ with the values $V(f_{i\pm 1})$, the result of said comparison making it possible to deduce whether said frequency $f_i$ is effectively recognized. The invention is applicable to the signalling between automatic telephone exchanges or between subscribers and telephone exchanges.

3 Claims, 8 Drawing Figures

Fig_3

Fig_4

Fig_5

DIGITAL RECEIVER OF MULTIFREQUENCY SIGNALS WITH FREQUENCY RECOGNITION DEVICE

BACKGROUND OF THE INVENTION

The present invention relates to a digital receiver for multi-frequency signals with pulse code modulation and more particularly to a device for recognizing each of the frequencies to be detected.

Such multifrequency signals are particularly used for signalling between automatic telephone exchanges or between subscribers and telephone exchanges. The signalling codes, called code $R_2$ or code MF SOCOTEL in the first case and "keyboard" code in the second, are most often formed from two frequencies belonging to a group of N frequencies, one frequency only being present for the monitoring frequency of the MF SOCOTEL code. The purpose of the multi-frequency digital receivers is to detect the presence of these frequencies in a signal, these frequencies sometimes being called reference frequencies.

Applicants' French Pat. No. 2 299 769 already discloses a digital device receiving multi-frequency signals. It consists essentially in effecting the intercorrelation of the incoming signal with signals indicative of reference frequencies, said signals being in sine and cosine form and being stored in the form of samples in read-only memories, compressed according to a logarithmic law. A threshold detector compares at the output the magnitude of the result of calculation determining the detection of a frequency.

The present invention also employs the functions of intercorrelation of the incoming signal E with signals indicative of the reference frequencies placed in sine and cosine form but previously weighted by time windows. The use of time windows has already been described in earlier documents, e.g. the article IEEE Trans. on Communications of December 1973 by Messrs. KOVAL and GARA describes application thereof to the time filtering of signals by means of time windows which weight the samples of the incoming digital signal $E_n$, as a function of their rank, in order to attenuate the effect of the adjacent frequencies.

A time truncation brings about a distorsion in the harmonic analysis of the signal. The article by F. J. HARRIS in Proceedings of the IEEE Vol. 6, no. 1, January 1978 describes the effect of the windows on the spectral distribution by Fourier transform of a signal.

In multifrequency digital receivers, the function of the truncations is to eliminate the influence of the frequencies detrimental to the algorithm of decision. To this end, the selected windows must present weak lateral lobes in order to reduce the affect of signals belonging to other frequency bands of the spectrum.

Figure 1:
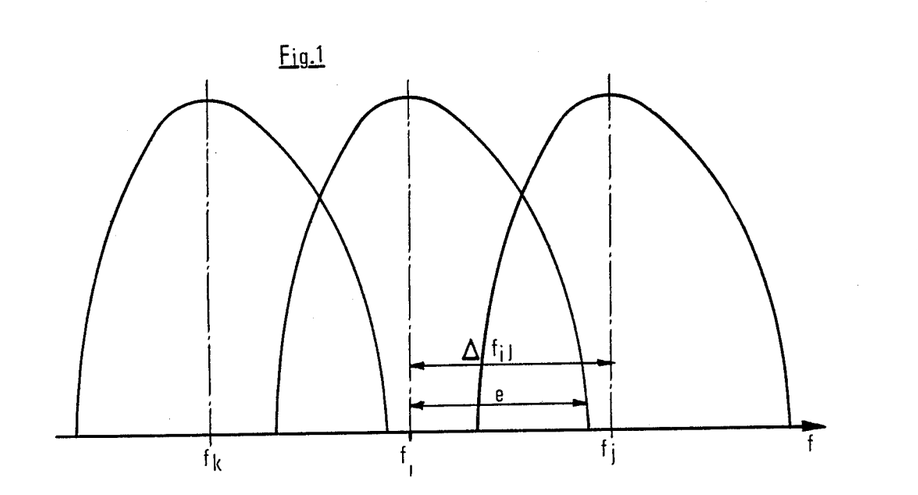
FIG. 1 represents the evolution of a characteristic value V around a frequency $f_d$ to be detected, according to the prior art.

It was also usual to choose time windows with a narrow central lobe; in particular, if $f_i$ and $f_j$ are two reference frequencies for the selected code, and adjacent, it was appropriate to adopt a window of width such that the distance e between the centre of the central lobe and one of its edges, of infinite attenuation, is less than $\Delta f_{ij}$, the distance between the two nominal frequencies $f_i$, $f_j$. Such a characteristic has been described for example in French Pat. No. 2 424 669, page 7, lines 15–25. FIG. 1 shows this criterion of the prior art of discernability of two frequencies $f_i$ and $f_j$ ($e < \Delta f_{ij}$).

The invention proposes to select time windows wherein around a frequency $f_i$ at the immediately adjacent frequencies $f_{i\pm 1}$ there is not an infinite attenuation of the central lobe, but, on the contrary, there is an attenuation greater than or equal to a predetermined value K at $f_{i\pm 1}$, but infinite attenuation at the following frequencies $f_{i\pm 2}$.

Such a choice gives the time windows of the invention a new function of recognition of a frequency $f_i$ by establishing values V (f) for adjacent frequencies $f_{i+1}$ and $f_{i-1}$, the values $V(f_i)$, $V(f_{i+1})$ and $V(f_{i-1})$ conserving predetermined relations with one another.

SUMMARY OF THE INVENTION

The device of the invention comprises first means for forming characteristic values $V(f_i)$ for each frequency $f_i$ and for forming characteristic values $V(f_{i\pm 1})$ for the adjacent frequencies of the code in question, second means for comparing $V(f_i)$ with the values $V(f_{i+1})$ and $V(f_{i-1})$, the result of said first comparison making it possible to deduce whether said frequency $f_i$ is effectively present.

According to a further feature of the invention, said first means furnish characteristic values $V(f_{i\pm 2})$ for the frequencies non adjacent to $f_i$ of the code considered, and said second means furnish a second result by comparing said characteristic value $V(f_i)$ for the frequency $f_i$ with the characteristic values $V(f_{i\pm 2})$ for the non-adjacent frequencies $f_{i\pm 2}$, said second result validating said first result by a second test determining whether the frequency present is effectively recognized.

According to a further feature of the invention, said magnitudes $V(f_i)$ characteristic of a frequency are logarithms of magnitudes $D_i$.

According to yet another feature, said first means comprise means for adding the corrected incoming sample with reference samples $L_n$ (producing $X_n$), said samples $L_n$ representing the logarithm of the product of the time truncation $W_n$ by the reference signal $R_n$, means for expressing in exponential form $K_n$ the result $X_n$ of said addition means, means for standardizing the results of said means of exponentiation, means for forming the square of the results of said standardizing means and means for adding said squares and for deducing therefrom said characteristic values $V(f_i)$.

The invention makes it possible to overcome parasitic frequencies and to determine with greater security and assuredness the recognition of a frequency.

BRIEF DESCRIPTION OF THE DRAWINGS

The invention will be more readily understood on reading the following description with reference to the accompanying drawings, in which.

DETAILED DESCRIPTION OF THE INVENTION

It is well known that the multiplication in the time domain of an incoming signal by a time-limited sequence is equivalent to a convolution in the frequency domain.

Thus, if $E(t)$ is the incoming signal and $W(t)$ is the time window used, the analysed signal is written in the time domain $$S(t) = E(t) \cdot W(t)$$

or, in the frequency domain $$S(\omega) = E(\omega) * W(\omega)$$

and $$S(\omega o) \int_{-\infty}^{+\infty} E(\omega) \cdot W(\omega - \omega_0) \, d\omega$$

where $\omega$ is bound to frequency f by the relation $\omega = 2\pi f$.

The time window therefore causes a distorsion in the harmonic analysis of the signal. This fact has already been mentioned for example in the above-mentioned article by F. J. Harris.

The Fourier transform (inverse) of the time function $W(t)$ limited on $(-t/2, t/2)$, a well defined interval, is a function $W(f)$ presenting maxima and minima in the frequency domain. Thus, a rectangular window (of time) has for a Fourier transform (inverse) the function:

$$W(f) = \sin \pi ft / ft,$$

presenting a considerable central lobe and slowly decreasing alternately negative and positive secondary lobes. A similar structure, central lobe surrounded by secondary lobes of small amplitude, is also obtained by means of other time windows, for example of Hamming, Kaiser, Bessel, Dolph, Chebyschev, Temes, . . . .

The present invention proposes to choose any one of these time windows, but presenting a time duration $\tau$ such that the central lobe, in the frequency domain, is no longer zero or with infinite attenuation at the frequencies $f_{i-1}$, $f_{i+1}$ adjacent to $f_i$, as in the prior art, but whose central lobe presents an infinite attenuation for the following frequencies, said frequencies $f_{i+1}$ and $f_{i-1}$ being reference frequencies.

Such a window making it possible to obtain a central lobe presenting the desired characteristics, depends on numerous parameters. For example, the frequency f to be detected invites using certain types of time windows. As will be explained hereinafter for detecting the frequency 770 Hz of the keyboard code, a Hamming window is used on 127 samples of expression:

$$W(n) = 0.54 = 0.46 \cos\left(\pi \frac{n - 63}{63}\right)$$

Such a window makes it possible to obtain a central lobe presenting the desired characteristics. Other time windows within the scope of the man skilled in the art would also suit.

As the component frequencies f present in the multifrequency signals are defined with a tolerance $\pm \epsilon$, this results, at reception, in a domain of uncertainty around $f_i$.

If E is the incoming digital signal, formed by M samples $E_n$, if W is the function of the time truncation and T the sampling period, the P couples of values $A(f)$ and $B(f)$ hereinbelow are indicative of the presence or absence of the frequency $f (5 \leq P \leq 8)$:

$$\begin{cases} A(f) = \sum_{c}^{M-1} E_n \sin(2\pi f n T) \cdot W_n \\ B(f) = \sum_{c}^{M-1} E_n \cos(2\pi f n T) \cdot W_n \end{cases}$$

The characteristic values $V(f)$ are written $V(f) = A^2(f) + B^2(f)$ and are calculated for the P frequencies f belonging to the code.

Figure 2:
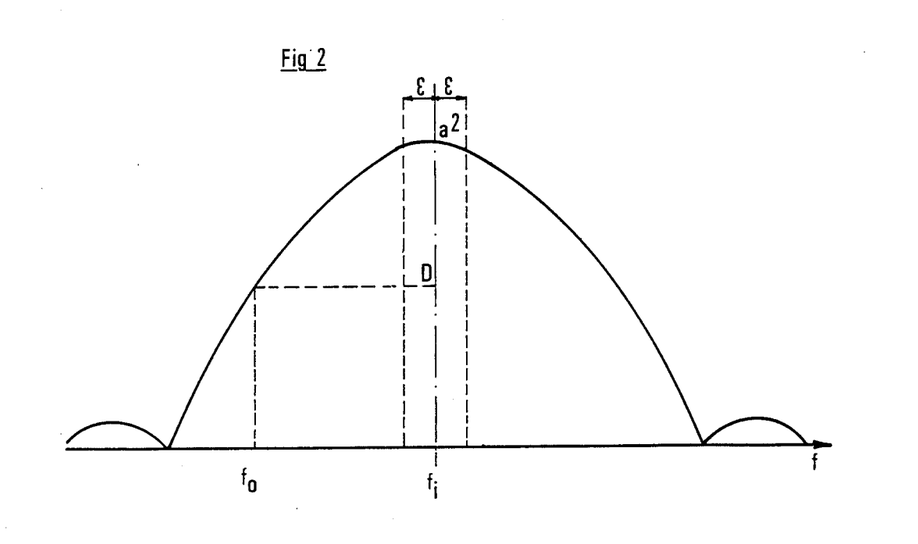
FIG. 2 illustrates the problem raised according to the invention.

FIG. 2 shows the characteristic values of the function $V(f_i) = A_i^2 + B_i^2$ according to a logarithmic scale. Curve $V(f)$ indicates the evolution of the characteristic value V calculated at the point of frequency $f_i$ when the frequency f present in the incoming signal evolves around $f_i$. The gauge curvature, function and shape of this curve is connected with the choice according to the invention of the time window. When the incoming signal evolves around the value $f_i$, $V(f)$ decreases on moving away from $f_i$ along a continuous curve maximum for $f_i$.

The values $V(f)$ are proportional to the square of the amplitude of the incoming signal. Let us consider a signal containing $f_i$ at level a, the characteristic value V becomes:

$$V_i = a^2$$

Let us consider a signal containing $f_o$ at level A, the value V is written:

$$V_o = e^{-D} A^2$$

The characteristic value is in fact written in exponential form of general expression $e^{-D}$, D being a magnitude predetermined by the logarithmic coding of the signals, as will be explained hereinbelow.

Therefore if $A^2 = a^2 e^D$, $V_o = V_i$ and a frequency $f_o$ outside tolerance interval having a high level may simulate a sought frequency with a lower level.

Figure 3:
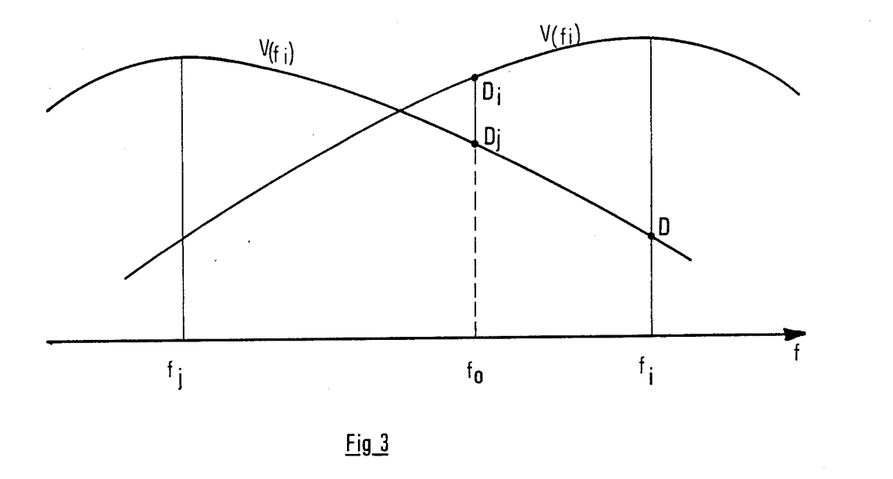
FIGS. 3 and 4 illustrate the criterion of decision of the invention of the recognition of a frequency.

The truncation is defined according to the invention so as to overcome this drawback. In fact, with reference to FIG. 3, let two curves $V(f_i)$ and $V(f_j)$ be characteristic of the reference frequencies $f_i$ and $f_j$. They present secant central lobes. Let $f_o$ be a frequency placed between two frequencies $f_i$ and $f_j$. The characteristic values obtained are:

$$\text{for } f = f_i \text{ at level } a \begin{cases} V(f_i) = a^2 \\ V(f_j) = a^2 e^{-D} \end{cases}$$

$$\text{for } f = f_o \text{ at level } C \begin{cases} V(f_i) = C^2 e^{-Di} \\ V(f_j) = C^2 e^{-Dj} \end{cases}$$

This makes it possible to determine without ambiguity whether $f_o$ is a component frequency or must be rejected. In fact, measurement of the difference, in logarithmic scale, $V(f_i) - V(f_j)$ authorizes rejection of this frequency since the difference $(D_i - D_j)$ is too small. In fact, the time window according to the invention is defined so that, for adjacent frequencies, the characteristic values $V(f)$ conserve predetermined relations between themselves, said adjacent frequencies being taken from among the reference frequencies.

The main lobe must therefore be sufficiently wide for the characteristic value of $V(f_j)$ to be nonzéro in $f_i$ and vice versa. However, the lateral lobes must remain small to eliminate the parasitic frequencies such as the frequencies outside the adjacent frequencies.

Figure 4:
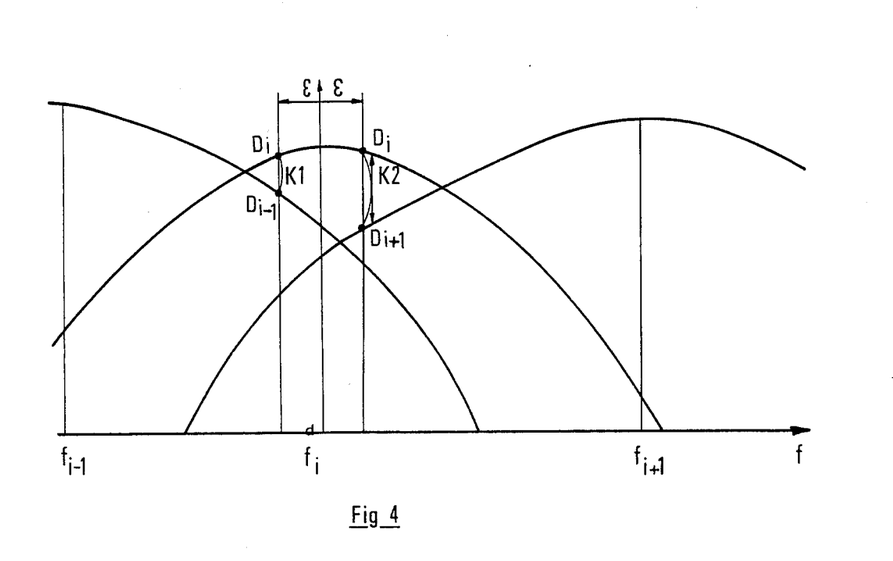

FIG. 4 shows a particularly advantageous mode of frequency recognition employed according to the invention. In the interval $\pm\epsilon$ around the nominal value, the relations (relates to a first result) are checked between the frequency $f_i$ and the adjacent frequencies $f_{i-1}$ and $f_{i+1}$, i.e. whether $D_i - D_{i-1} \geq k_1$ and $D_i - D_{i+1} \geq k_2$ in this interval $f_i \pm \epsilon$, $k_1$ and $k_2$ being appropriately chosen constants. The interval $\epsilon$ depends on the frequency $f_d$ to be detected for certain codes and is fixed by the specifications.

Figure 5:
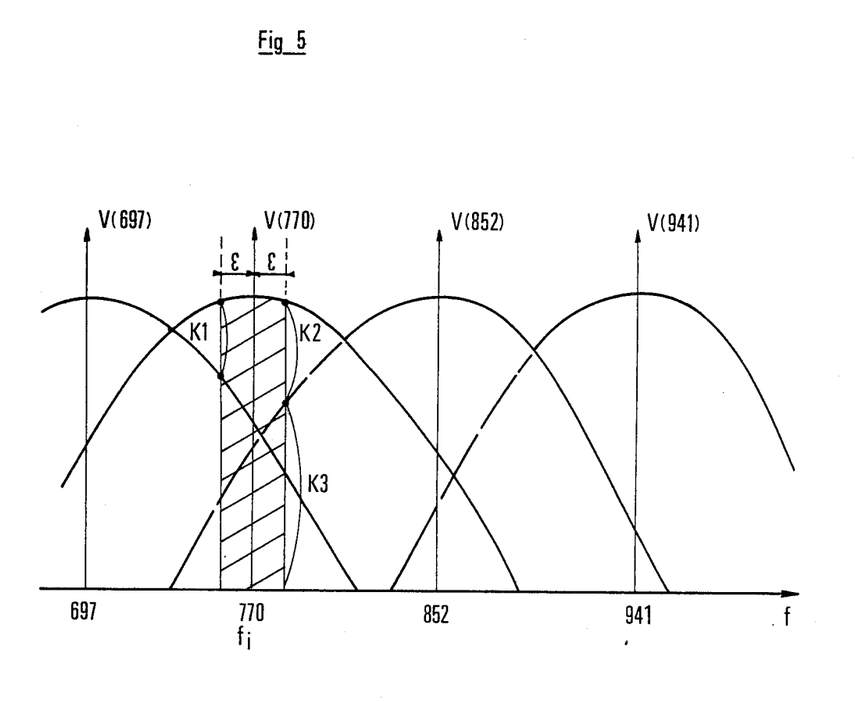
FIG. 5 illustrates the recognition of the frequency 770 Hz of the keyboard code.

The example of FIG. 5 concerns the keyboard code used in subscriber signalling. The bi-frequency combination used in the code is as follows: one frequency belongs to the "low" group, i.e. 697 Hz, 770 Hz, 852 Hz, 941 Hz, while the second frequency belongs to the "high" group, i.e. 1209 Hz, 1336 Hz, 1477 Hz, 1633 Hz.

For frequency $f_i = 770$ Hz, the interval $\pm \epsilon$ around the nominal frequency is equal to $\pm 17$ Hz. The frequence $f_i = 770$ Hz is recognized according to the invention if, for any frequency f belonging to the interval (770 Hz $\pm 17$ Hz) is still (753 Hz $-$ 787 Hz), the characteristic values $V(f)$ of this frequency check:

$$V(f) - V(697) \geq K_1(770)$$

and $$V(f) - V(852) \geq K_2(770)$$

The values $K_1(f)$ and $K_2(f)$ depend on the logarithmic coding of the magnitudes $V(f)$, of the time window as well as on the frequency description of this window.

Then, after this first test producing a first result directed to the adjacent frequencies, a second test producing a second result is carried out on the frequencies $f_{i+2}$ or 941 Hz in the present example. It is checked, for $f = 770$ Hz $\pm 17$ Hz, i.e. in the interval (753 Hz, 787 Hz), whether the inequation $V(f) - V(941) \geq K_3(770)$ is respected, i.e. whether the frequency 941 Hz is effectively absent. The constant $K_3(770)$ is also appropriately chosen as a function of the time window used and the frequencies composing the code.

Figure 6:
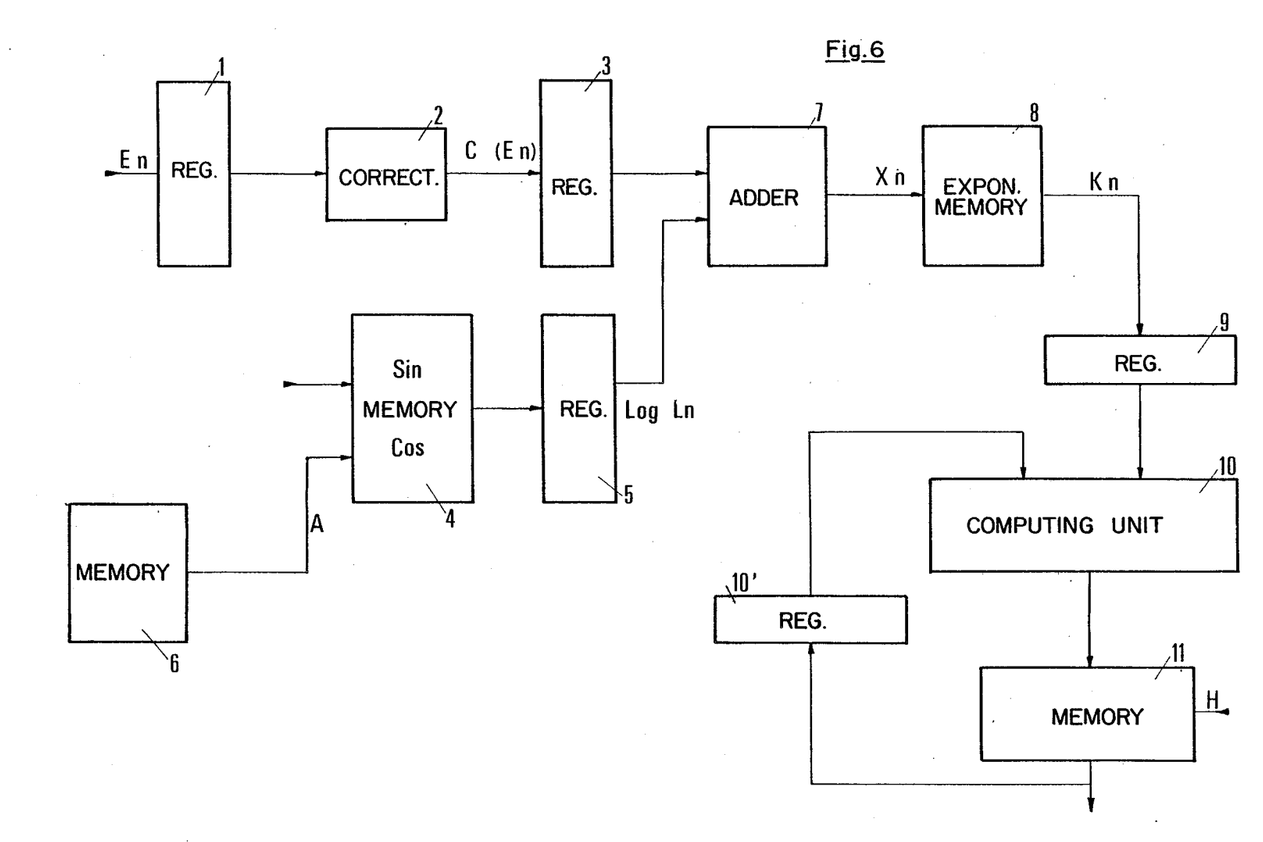
FIG. 6 shows a block diagram of the information processing means of the receiver of the invention, otherwise known as an embodiment of a first part of the first means of the invention, "first means" being the means for forming characteristic values $V(f_i)$ for each frequency $f_i$ and for forming characteristic values $V(f_{i\pm 1})$ for the adjacent frequencies.

FIG. 6 shows a preferred embodiment of the information processing means (first part of the first means). The incoming digital signal formed by samples $E_n$ is memorized in a first buffer register 1 then placed in the form of a logarithmic code by means of a corrector 2 which furnishes at the output the amplitude of the coded signal according to a linear law Log $E_n$. Applicants' French Pat. No. 2 229 769 discloses coding the signals according to a quasi logarithmic law to express the intercorrelation of the incoming signal with the standard frequencies. In the present invention, the time window is likewise coded then memorized in logarithmic form. These samples $C(E_n) = \text{Log } E_n$, issuing from the corrector 2 are applied to the input of a second buffer register 3. The integrals of intercorrelation are formed between the incoming sequence $E_n$ and the reference signals, calculated on a finite number of samples.

The sample $W_n$ of the time truncation and the sample $R_n$ of the reference signal depend on the processed code and are therefore data of the system. The product $L_n = W_n \cdot R_n$ is memorized in a buffer 4 coded in a logarithmic form according to the invention. A memory 6 containing the channel allocation information addresses this buffer 4, i.e. indicates the signalling code "present" on the channel.

The functions of intercorrelation are therefore expressed by:

$$K = \sum_\eta K_n = \sum_\eta E_n (W_n \cdot R_n) = \sum_\eta E_n \cdot L_n$$

The product $E_n(W_n \cdot R_n)$ is also expressed by employing the logarithmic and exponential functions.

$$E_n \cdot L_n = \exp(\text{Log } E_n + \text{Log } L_n)$$

therefore Log $K_n = C(E_n) + \text{Log } L_n$

The samples Log $L_n$ are extracted from the register 4 by scanning the addresses and applied to the input of a buffer register 5.

An addition circuit 7 adds, at each instant n, the samples $C(E_n)$ and Log $L_n$ issuing from memories 3 and 5 respectively for furnishing at the output $X_n = C(E_n) + \text{Log } L_n$.

A programmed memory 8 receives this sample $X_n$ and furnishes at the output the sample $K_n$ such that $K_n = \exp(X_n)$. The outgoing signal $K_n$ is coded according to the invention on 11 binary elements. In fact, the corrector 2 receives the 7 binary elements of the incoming PCM signal $E_n$ indicating the absolute value of the amplitude. The logarithmic approximation necessitates 8 binary elements. The reference samples contained in the register 4 are also coded by means of 8 binary elements. The memory capacity required for a system processing four types of codes and integrating the functions on 128 samples is 8K words of 8 binary elements. The buffer 7 which transmits only the absolute value of the samples furnishes 7 binary elements at the input of the addition circuit 7.

The addition circuit 7 furnishes the logarithm of the product of the incoming signal and the reference signal and is coded on 9 binary elements. As the product is expressed by $2^L$, this makes it possible to limit the exponentiation memory 8 which carries out the operation $\exp = 2^L \times 2^{-8}$ and to code the exponential linearly on 11 binary elements. This exponentiation is then effected by means of a programmed memory of 512 words of 11 binary elements. The results $K_n$ are applied to the input of a third buffer register 9.

The functions of intercorrelation $$\sum_\eta E_n \cdot L,$$

for each of the sine and cosine functions are effected by means of a computing unit 10 which applies the coded result on 16 binary elements in a read/write memory 11 at the rate of a clock H. This memory 11 has a capacity of 512 words of 16 binary elements corresponding to the 16 functions of intercorrelation calculated on 16 binary elements for the 32 channels processed in series. A fourth buffer register 10' memories the intermediate results extracted from the memory 11 and reapplies them to the input of the computing unit 10.

Figure 7:
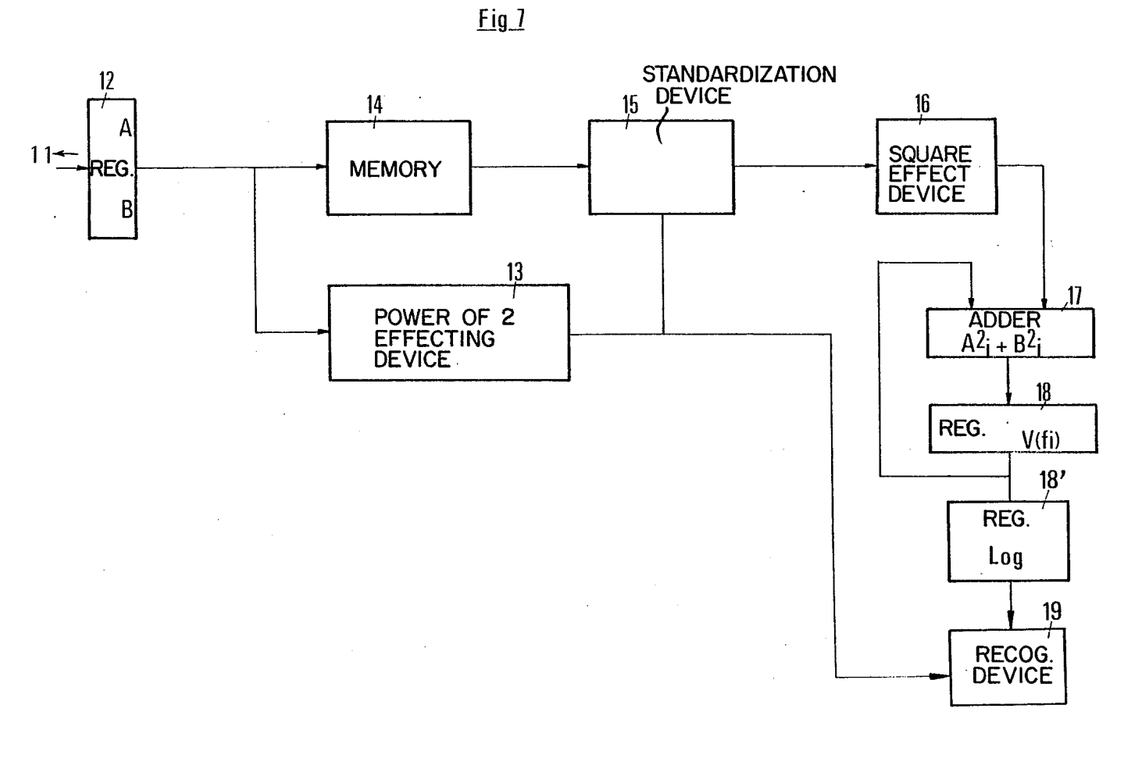
FIG. 7 shows a block diagram of the means for forming characteristic values $V(f_i)$ of the receiver of the invention, otherwise known as an embodiment of the second part of the first means of the invention.

The calculated values are extracted from the read/write memory 11 towards the processing unit shown in FIG. 7.

The characteristic values V (f) are expressed as the square of the functions A and B of intercorrelation associated with a frequency f. As shown in FIG. 7, the preprocessing logic is composed of a first buffer register 12 containing the values A and B furnished by the memory 11 for each channel. The magnitudes A and B undergo an operation of standardization making it possible to reduce the number of binary elements representing each of the functions of intercorrelation.

To this end, the greatest power of 2 present in the values $A_i$ and $B_i$ is determined, i.e. $2^N$. This power N is then called the standardization power. A device 13 effects determination of the greatest power of 2 from the values $A_i$ and $B_i$ issuing from the memory 12 and furnishes this result to the input of an actual standardization device 15. This device 15 also receives the values $A_i$ and $B_i$ furnished by the memory 12, $\alpha_i$ and $\beta_i$ which are furnished at the output of device 15, being coded on 8 binary elements and deduced from $A_i$ and $B_i$ by the relations:

$$\alpha_i = \frac{A_i}{2^{N-7}} \text{ and } \beta_i = \frac{B_i}{2^{N-7}}$$

In the following description, $\alpha_i$ and $\beta_i$ will be called $A_i$ and $B_i$, it being understood that they are standardized. A circuit 16 receives these standardized magnitures, issuing from the device 15, and furnishes the square thereof at the output (of circuit 16). A programmed memory may effect this transformation with a capacity of 256 words of 8 binary elements. These squares are applied to the input of an addition circuit 17, associated in two's for each channel $i(A^2_i + B^2_i)$. In fact, the addition operation is effected in two stages: in a first stage, an operation $O + A^2_i$ is effected then placed in a second buffer register 18 then, in a second stage, the operation $A^2_i + B^2_i$ is effected then placed in register 18 until the end of the computing instant i. This register 18 retains in memory just one characteristic value $V_i$ which is then applied to the input of a coder 18 transforming this magnitude into logarithmic code. This logarithmic coding will make it possible, during the subsequent processing, to compare the characteristic magnitudes $V(f_1)$ with one another by a simple subtraction. The characteristic magnitudes $V(f_i)$ issuing from the register 18' are then applied to the input of an actual recognition device 19.

Figure 8:
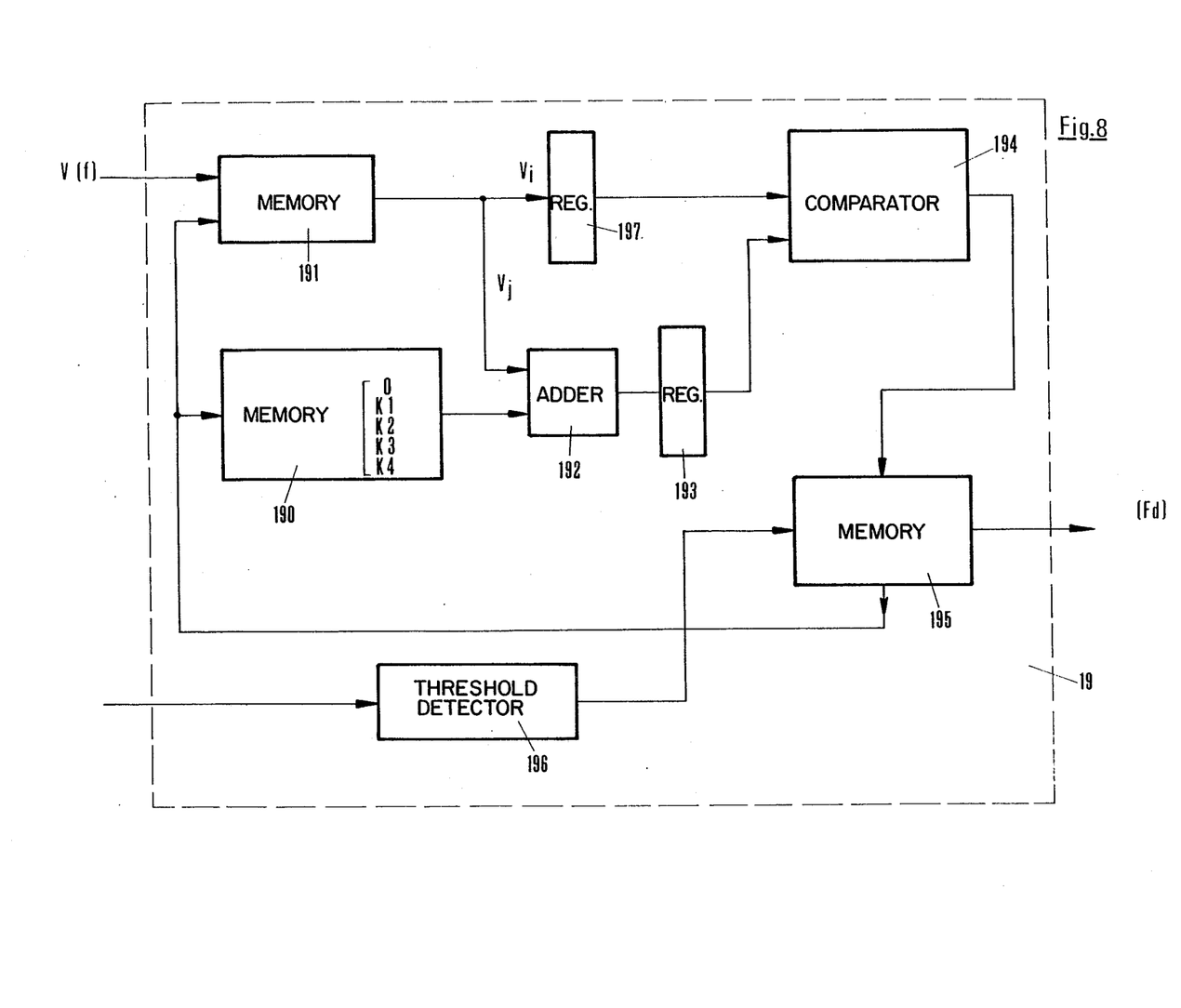
FIG. 8 shows a block diagram of the recognition device of the receiver of the invention, otherwise known as in wired logic, the second means; of the frequency recognition device according to the invention; "second means" being the means for comparing the value $V(f_i)$ with the values $V(f_{i+1})$ and $V(f_{i-1})$.

This device 19, illustrated in FIG. 8, comprises a read/write memory 191 receiving the magnitudes V (f), a read-only memory 190 containing the constants O, $K_1(f)$, $K_2(f)$, $K_3(f)$, $K_4(f)$ used during the running of the algorithm of decision, a sequencing read-only memory 195 controlling the whole as a function of the results obtained at the output of a comparator 194, this memory 195 furnishing the addresses of memories 191 and 190.

A first series of comparisons made by this comparator 194 determines the greatest characteristic value from all those furnished by the read/write memory 191. To this end, the read/write memory 191 furnishes magnitudes $V(f_i)$ to the input of the comparator 194 via a first buffer register 197. Values $V(f_j)$ also furnished by the read/write memory 191 are applied to the input of an addition circuit 192 which then receives the constant 0 from memory 190 during this first phase of comparisons. The addition circuit 192 is connected to the comparator 194 via a second buffer register 193.

As soon as the comparator 194 has determined the greatest characteristic value $V(f_i)$, for example, this value is memorized in the buffer register 197. The magnitudes $V(f_{i-1})$, $V(f_{i+1})$, $V(f_{i-2})$, $V(f_{i+2})$ extracted from the buffer register 193 are then compared with $V(f_i)$. The differences are measured and compared with the constants $K_1(f_i)$, $K_2(f_i)$, $K_3(f_i)$, $K_4(f_i)$ furnished by the read-only memory 190. If the variations are greater and respond to the criterion of recognition described previously, the comparator 194 furnishes a result at the input of the sequencing read-only memory 195. This memory 195 indicates the validity of the detected frequency $f_i$ corresponding to $V(f_i)$ maximum. This result is validated by a threshold detector 196 which receives at the input the greatest power of 2 furnished by the device 13 used in the function of standardisation. This detector 196 thus checks that the levels $V(f_i)$ present are in accordance with the dynamics imposed by the specifications and validates the result at the input of the memory 195 which consequently furnishes $f_i$ at the output, detected frequency corresponding to $V(f_i)$.

The device according to the invention is applicable to the detection of any tone, to tests of equipment, etc.

What is claimed is:

1. Digital receiver of multi-frequency signals with frequency recognition device comprising:

memorizing means for memorizing an incoming digital signal formed by samples $E_n$;

logarithmic coding means for coding said samples $E_n$ into samples Log $E_n$;

memorizing means for memorizing reference samples Log $L_n$, $L_n$ representing the product of a reference signal $R_n$ by a time truncation $W_n$ corresponding to a time window of which said time truncation function, in the frequency domain, has a central lobe having a definite but not infinite attenuation for the frequencies $f_{i\pm1}$ adjacent each frequency $f_i$ to recognize, and an infinite attenuation for the non-adjacent frequencies;

adding means for adding said samples Log $E_n$ and said reference samples Log $L_n$ from said logarithmic coding means and said memorizing means, respectively, and forming a sum signal $X_n = $ Log $E_n + $ Log $L_n$;

exponentiation means connected at the output of said adding means for transforming said sum signal $X_n$ into an exponential signal exp $(X_n)$, and thus for effecting the intercorrelation $E_n \cdot (W_n \cdot R_n)$ of said incoming signal $E_n$ with said reference samples $R_n$ according to $$\exp(X_n) = \exp(\text{Log } E_n + \text{Log } L_n)$$

$$\exp(X_n) = E_n \cdot L_n$$

$$\exp(X_n) = E_n \cdot (W_n \cdot R_n);$$

means for forming characteristic values $V(f_i)$ connected to the output of said exponentiation means for each frequency $f_i$ and for forming values $V(f_{i\pm 1})$ characteristic of V for the frequencies of said signal adjacent the frequency $f_i$, said means for forming characteristic values, having an output, comprising:

means for standardizing the results of said exponentiation means, said standardizing means comprising means for dividing the results of said exponentiation means by $2 \exp(N-7)$, where N is the greatest power of 2 in said results, squaring means for forming the square of the results of said standardization means, and means for adding the results of said squaring means and for producing therefrom said characteristic values $V(f_i)$; and comparing means for determining the greatest characteristic value $V(f_i)$, comprising comparing differences $V(f_i) - V(f_{i-1})$ and $V(f_i) - V(f_{i+1})$ to first predetermined constants $K1(f_i)$ and $K2(f_i)$ respectively, and furnishing a first recognition result of said frequency $f_i$ if both said differences are greater than said constants.

2. Digital receiver according to claim 1 wherein said means for forming characteristic values further furnishes characteristic values $V(f_{i\pm 2})$ for the frequencies not adjacent to $f_i$ and said comparing means further furnishes a second recognition result if differences $V(f_i) - V(f_{i-2})$ and $V(f_i) - V(f_{i+2})$ are both greater than second predetermined constants $K3(f_i)$ and $K4(f_i)$, said second recognition result validating said first recognition result.

3. Digital receiver according to claim 1, wherein said means for forming characteristic values $V(f_i)$ further comprises a coder, having an input and an output, said input connected to said output of said means for adding and operable when said means has totalled the results of said squaring means;

said output of said coder providing a logarithm of the value of said input, and said output being then considered the output of said means for forming characteristic values $V(f_i)$, said output values then considered as characteristic values $V(f_i)$.

* * * * *